Dec. 20, 1949     J. DOLZA ET AL     2,491,484

WATER INJECTION SYSTEM

Filed Aug. 19, 1944     6 Sheets-Sheet 1

INVENTORS
Milton A. Trisler
Clyde R. Paton
BY John Dolza
Spencer Hardman Jr. Tehr
their ATTORNEYs

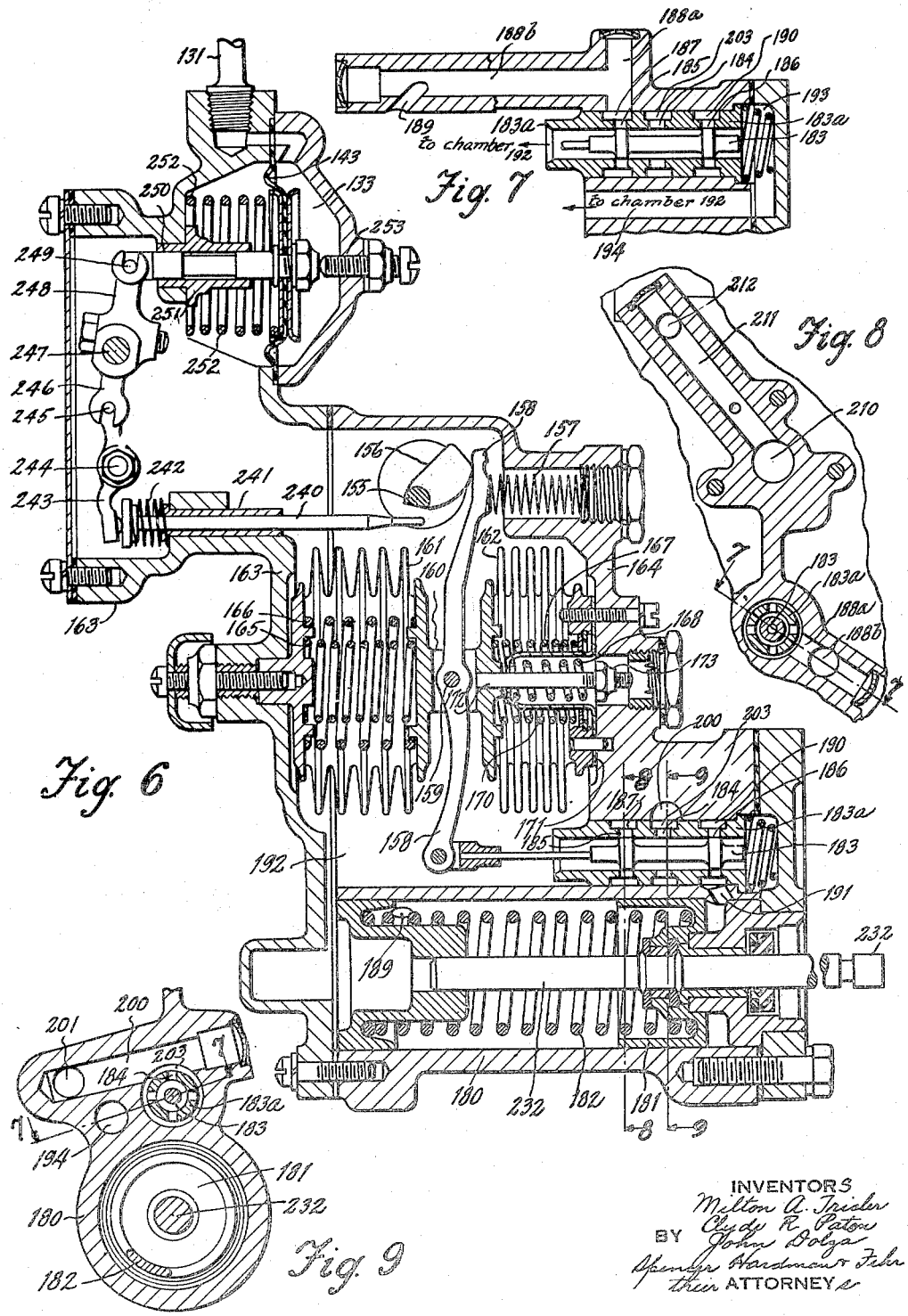

Patented Dec. 20, 1949

2,491,484

UNITED STATES PATENT OFFICE 2,491,484

WATER INJECTION SYSTEM

John Dolza and Milton A. Trisler, Indianapolis, Ind., and Clyde R. Paton, Birmingham, Mich., assignors to General Motors Corporation, Detroit, Mich., a corporation of Delaware Application August 19, 1944, Serial No. 550,232

10 Claims. (Cl. 123—25)

This invention relates to a system of control of water injection in the fuel mixture of a supercharged aircraft engine and to the control of intake manifold pressure incident to water injection.

An object of the invention is to cause water injection to take place automatically when the difference between intake manifold pressure and altitude pressure or carburetor impact pressure attains a certain value, and to make it possible to obtain certain high manifold pressures only so long as the water injection is operating, and automatically to limit manifold pressure to a lower value safe for engine operation without detonation when water injection ceases.

Further objects and advantages of the present invention will be apparent from the following description, reference being had to the accompanying drawings wherein a preferred embodiment of the present invention is clearly shown.

In the drawings:

Fig. 6 is a longitudinal sectional view of the throttle controller TC of Fig. 4.

Fig. 7 is a sectional view on lines 7—7 of Figs. 8 and 9.

Fig. 8 is a sectional view on line 8—8 of Fig. 6.

Fig. 9 is a sectional view on line 9—9 of Fig. 6.

Figures 1, 2, 12:
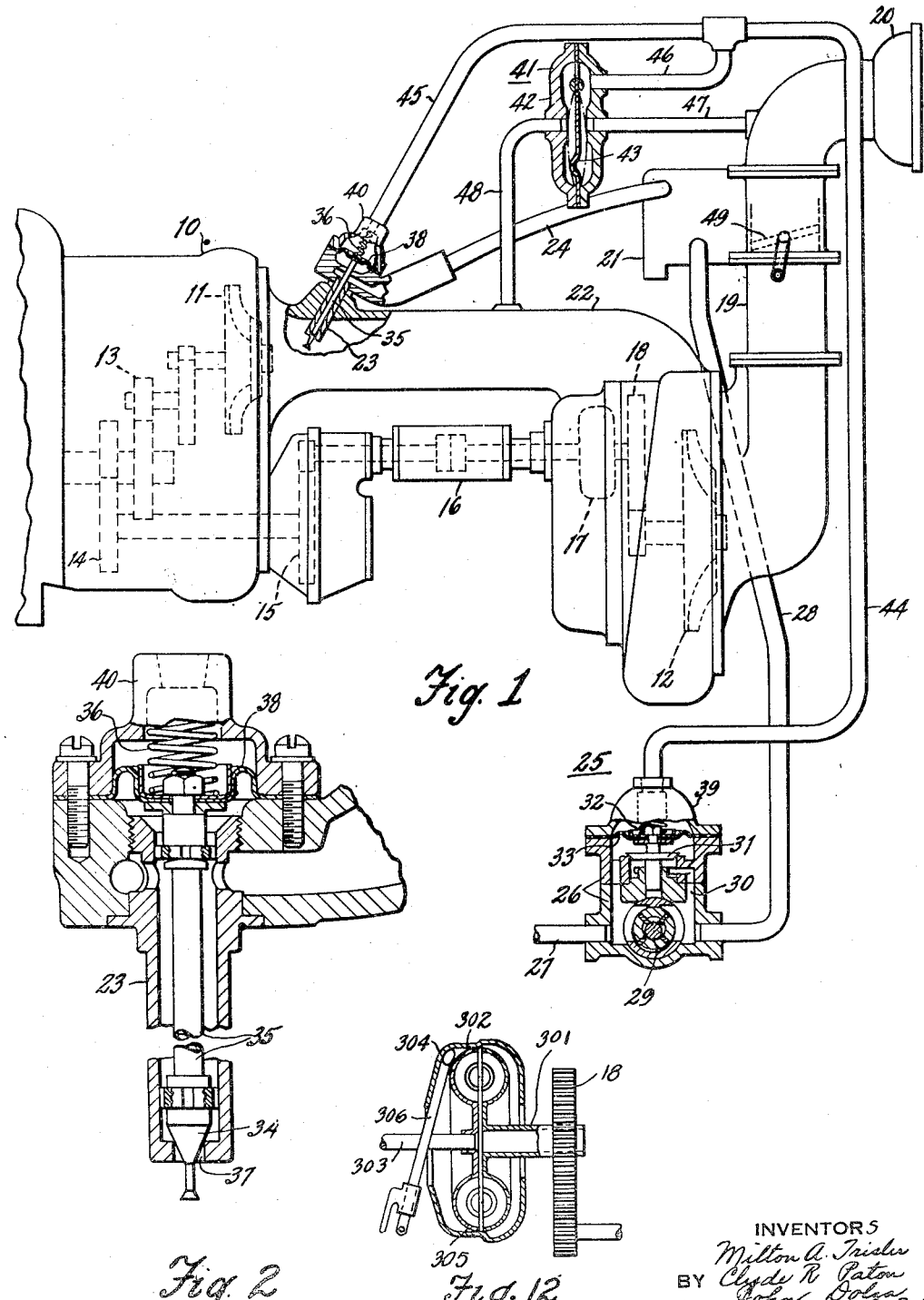
Fig. 1 shows diagrammatically a carbureting and supercharging system with which the present invention may be used.
Fig. 2 is an enlarged sectional view of a fuel nozzle shown in Fig. 1.
Fig. 12 is a diagrammatic view of a hydraulic coupling.

In Fig. 1, the reference character 10 indicates an internal combustion engine with a main centrifugal supercharger which includes an impeller 11 and an auxiliary centrifugal supercharger which includes an impeller 12. The impeller 11 of the main supercharger is driven from the crankshaft of the engine at a speed proportionate to the speed of the engine through gearing which is indicated generally by the reference character 13. The impeller 12 of the auxiliary supercharger is driven from the crankshaft of the engine at a speed which varies with respect to the speed of the engine through elements of the gearing 13, a gear 14, gearing 15, a universal joint 16, a fluid coupling 17 and gearing 18.

From a point at which air is forced into it by movement of the airplane to the intake side of the auxiliary supercharger there extends a duct 19 to whose outer end there is connected a scoop 20 which faces in the direction of movement of the airplane. In the duct 19 between the scoop 20 and the auxiliary supercharger there is interposed a fuel metering device 21, such as used in the Stromberg injection carburetor, which meters fuel at a rate which bears the desired relation to the rate of flow of air through the duct. To regulate the rate of flow of air through the duct, there is incorporated in the fuel metering device a butterfly type throttle valve 49. From the discharge side of the auxiliary supercharger to the intake side of the main supercharger extends a duct 22 into which projects immediately in advance of the impeller 11 of the main supercharger a fuel nozzle 23 which is connected to the fuel metering device 21 by a tube 24.

To advance fuel to the metering device 21 and, thence, to the fuel nozzle 23 through the tube 24 there is provided a fuel pump 25. The fuel pump 25 includes a body 26 with a fuel intake opening connected to the fuel tank of the airplane by a pipe 27 and a fuel discharge opening connected to the metering device 21 by a pipe 28 and an impeller 29 driven by the engine at a speed proportionate to the speed of the engine 10 to draw fuel into the intake opening and discharge it from the discharge opening. In the body 26 of the fuel pump there is provided a by-pass 30 through which fuel may return from the discharge opening to the intake opening and in this by-pass a valve 31. The valve 31 is urged to position to close the by-pass by a spring 32 and connected to a flexible diaphragm 33 whose inner side is exposed to the pressure of the fuel in the by-pass so that the valve will open when and remain open as long as the pressure of the fuel at the discharge opening of the pump exceeds the pressure to which the outer side of the diaphragm is exposed by a selected amount to the end of maintaining constant the pressure at which fuel is discharged from the pump.

To regulate the discharge of fuel from the nozzle 23 there is provided within the nozzle a conical valve 34 with a stem 35 which is urged by a spring 36 to the position in which it closes the discharge orifice 37 in the nozzle and connected to a flexible diaphragm 38 whose inner side is exposed to the pressure of the fuel in the nozzle so that the valve will open and fuel will be injected into the duct 22 when the pressure of the fuel in the nozzle exceeds the pressure to which the outer side of the diaphragm is exposed by a certain amount and the valve will remain open and fuel will continue to be injected into the duct 22 as long as the difference in pressure exceeds this amount.

When the engine 10 is operating, air enters the scoop 20 and passes therefrom through the duct 19, the metering device 21 and the auxiliary supercharger into the duct 22. Fuel is injected through the nozzle 23 into the air in the duct 22 and with it passes through the main supercharger into the cylinders of the engine.

To insure injection of fuel into the duct 22 in the form of a spray which will readily be entrained by the air in the duct, it is, of course, necessary to maintain the pressure of the fuel within the fuel nozzle 23 at a value well above that of the air in the duct 22 and the effective area of the orifice 37 in the fuel nozzle below a value which varies with the rate at which fuel is delivered to the fuel nozzle. To insure these things, it is necessary that the pressure at which fuel is discharged from the fuel pump 25 be maintained above a certain value and the valve 34 in the fuel nozzle be prevented from opening too far. To do these things it is necessary to prevent the pressure on the outer sides of the diaphragms 33 and 38 of the fuel pump and the fuel nozzle falling below a selected value and to insure injection of fuel into the duct 22 at a rate which bears the desired relation to the rate of flow of air to the engine and in the most desirable form it is preferable to maintain the pressure on the outer sides of the diaphragms constant.

Through the fluid coupling 17 the rate at which the impeller 12 of the auxiliary supercharger is driven is so regulated that the pressure in the duct 22 is maintained at about that of the atmosphere at sea level under all conditions of atmospheric pressure which obtain up to a selected altitude except when the engine is operating at low speeds when it is impracticable so to regulate it. At altitudes greater than the selected altitude within the range within which the engine 10 is intended to operate the rate at which the impeller of the auxiliary supercharger is driven is, through the fluid coupling, so regulated that the pressure in the duct 22 is, except, of course, when the engine is operating at low speeds, maintained at a value which while lower than that at which it is maintained up to the selected altitude is still higher than that of the surrounding atmosphere. The pressure in the duct 22 is, consequently, at times higher and at times lower than the pressure of the surrounding atmosphere.

To maintain the pressure on the outer sides of the diaphragms 33 and 38 of the fuel pump and fuel nozzle as nearly constant as possible at all speeds of the engine 10 under all conditions of atmospheric pressure, there is provided on the fuel pump a cover 39 for the diaphragm 33 and on the fuel nozzle a cover 40 for the diaphragm 38. The interiors of these covers are connected to the interiors of the scoop 20 and the duct 22 through a valve so constructed that the higher of the pressures of the air in the scoop and the air in the duct 22 is applied to the outer sides of the diaphragms 33 and 38. The valve referred to is indicated in the drawing by the reference character 41. It includes a hollow body 42 within which there is a flexible diaphragm 43. The connections between the interiors of the covers 39 and 40 and the interiors of the scoop 20 and the duct 22 which were mentioned are afforded by pipes 44, 45, 46, 47 and 48. The pipes 44 and 45 are connected, respectively, to the interior of the cover 39 and the interior of the cover 40. The pipe 46 is connected to the pipes 44 and 45 and to the interior of the body of the valve 41 so that it communicates with it on both sides of the diaphragm 43. The pipe 47 is connected to the interior of the scoop and to the interior of the body of the valve 41 on one side and the pipe 48 is connected to the interior of the duct 22 and to the interior of the body of the valve 41 on the other side of the diaphragm 43.

This arrangement insures that the outer sides of the diaphragms 33 and 38 will always be subjected to the higher of the pressures of the air in the scoop 20 and of the air in the duct 22 and, consequently, that the pressure on the outer sides of the diaphragms will be maintained as nearly constant as possible at all speeds of the engine under all conditions of atmospheric pressure. If the pressure of the air in the scoop becomes higher than the pressure of the air in the duct 22, the diaphragm 43 will flop over to a position in which it blocks communication between the duct 22 and the interior of the body of the valve and, consequently, as long as this condition obtains the outer sides of the diaphragms 33 and 38 will be subjected to the pressure of the air in the scoop. If the pressure of the air in the duct 22 becomes higher than the pressure of the air in the scoop, the diaphragm will flop over to a position in which it blocks communication between the scoop and the interior of the body of the valve and, consequently, as long as this condition obtains the outer sides of the diaphragms 33 and 38 will be subjected to the pressure of the air in the duct 22. The condition first mentioned obtains, as previously stated, only when the engine is operating at low speeds.

The arrangement which has been disclosed is not limited to use in conjunction with the particular carbureting apparatus which has been illustrated and described. It can also be used in conjunction with carbureting apparatus which includes one or more superchargers on whose engine side or sides the fuel is injected. It can also be used in conjunction with carbureting apparatus which includes one or more superchargers on whose atmospheric side or sides the fuel is injected but in the case of carbureting apparatus of this type it is not so important to apply the arrangement to the fuel nozzle. In the case of carbureting apparatus which includes a fuel pump of other than the by-pass type the arrangement may be applied to the fuel nozzle only.

Figure 3:
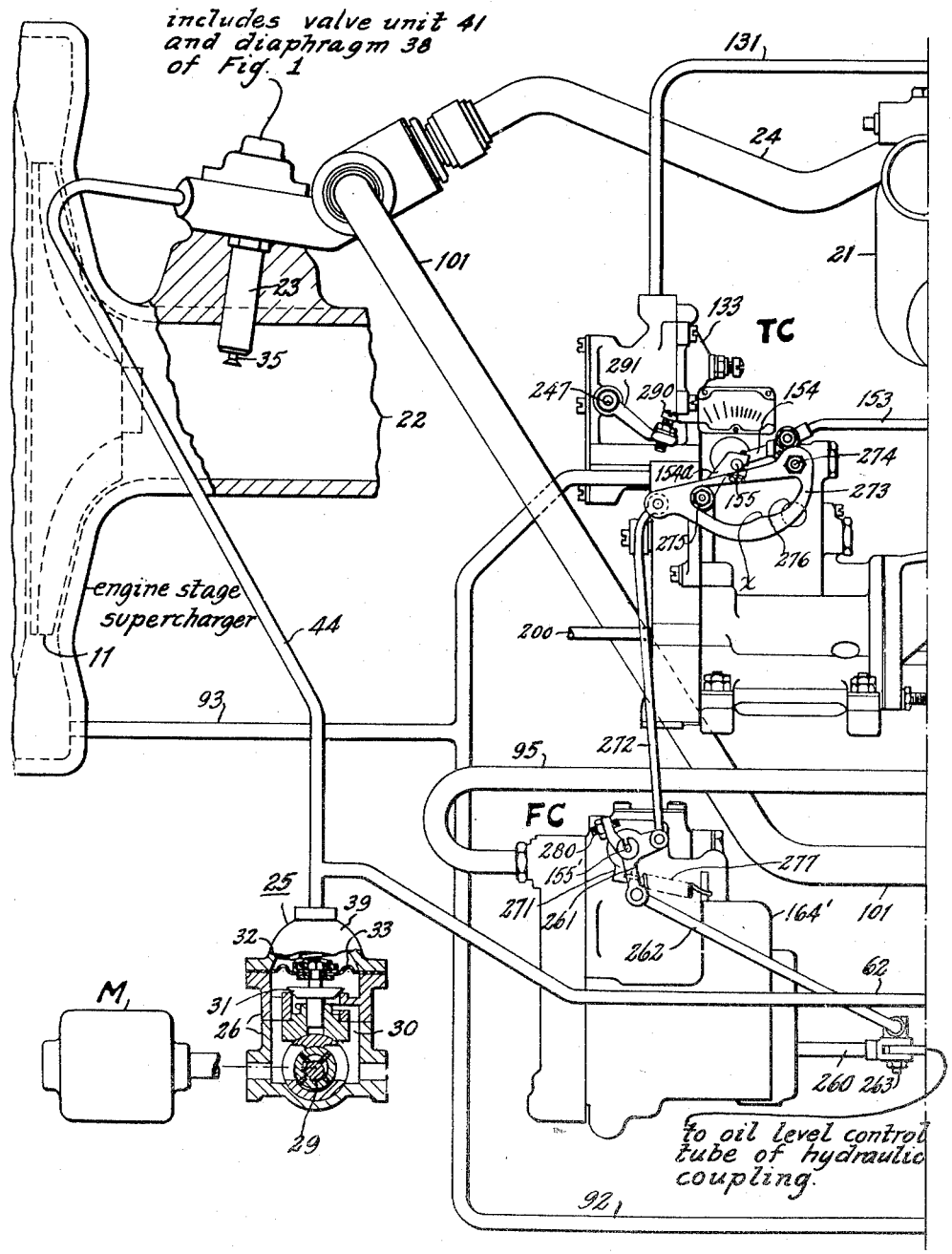
Figs. 3, 4 and 5 show a system of control of water injection and a coordinated control of intake manifold pressure provided by a throttle controller TC and a fluid coupling controller FC.
Figure 5:
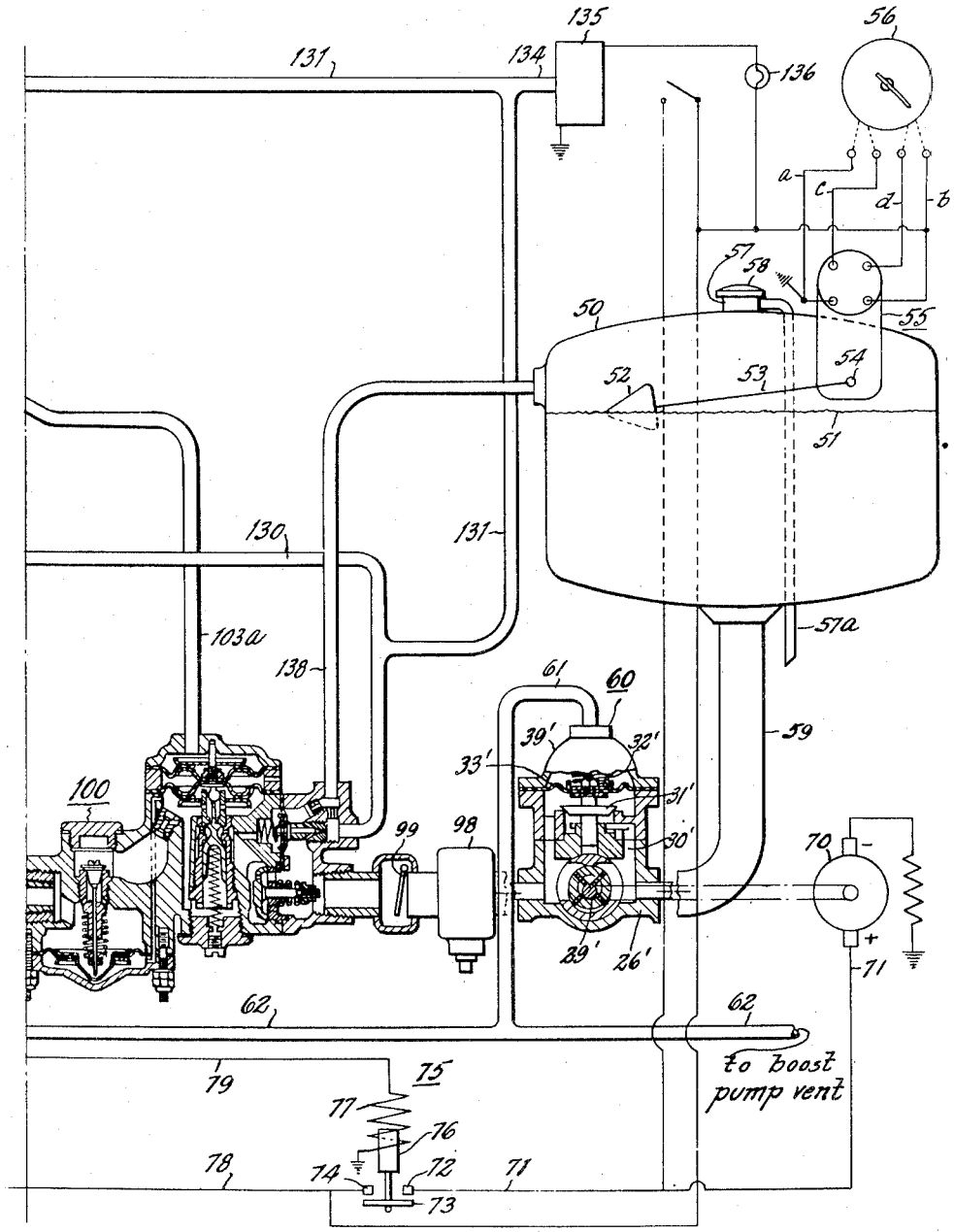

The water injection system comprises a tank 50 (Fig. 5) for containing alcohol-water mixture the highest level of which is indicated by line 51. A float 52 carried by arm 53 operates a shaft 54 of an electrical quantity transmitting device 55 which controls through the wires $a$, $b$, $c$ and $d$, a quantity meter 56. The tank is filled through an inlet 57 closed by a cover 58 after filling. Inlet 57 is connected with a vent pipe 57a. Tank outlet 59 connects with a pump 60 similar to fuel pump 25 (Fig. 1) and having a diaphragm chamber connected by pipe 61 with a pipe 62 connected with pipe 44 (Figs. 1 and 3) connected with vent selector valve 41. Pipe 62 is connected with the diaphragm chamber of a boost pump not shown. Thus, outlet pressures of all the pumps are controlled by vent selector valve 41.

Figure 4:
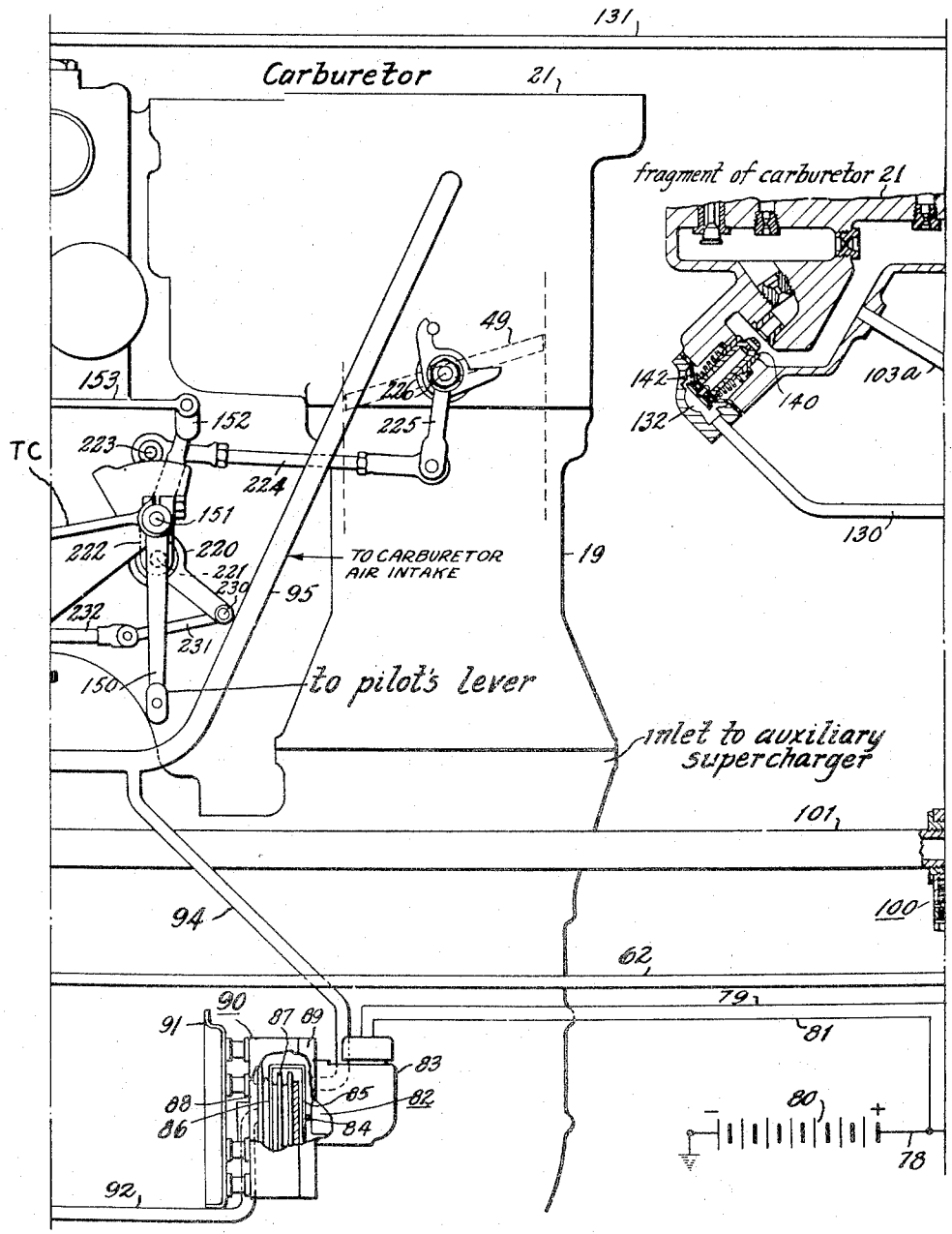

The pump 60 is driven by an electric motor 70 (Fig. 5) having its negative terminal grounded and its positive terminal connected by wire 71 with contact 72 of a relay 75 having a movable contact 73 for bridging contacts 72 and 74. Contact 73 is connected with a solenoid armature 76 which moves upwardly when coil 77 is energized. Contact 74 is connected by wire 78 with a battery 80 (Fig. 4) whose negative terminal is grounded.

Wire 79 connected to coil 77 and wire 78 connected to contact 74 are connected with a snap action switch 82 located in a housing 83 and having a push button 84 engaging a stirrup 85 located between the adjacent free ends of bellows 86 and 87 which have their respective opposite ends restrained by walls 88 and 89 respectively of a housing 90 attached to a support 91. Bellows 87 is evacuated to provide an aneroid. Bellows 86 is connected by pipes 92 and 93 (Figs. 3 and 4) with the scroll or outlet of the engine stage supercharger having the impeller 11. Housing 90 is connected with the carburetor anterior to the value 49 by pipes 94 and 95. Thus the switch 82 (Fig. 4) is caused to close in response to a certain difference between engine stage scroll pressure (or intake manifold pressure) and impact pressure (or altitude pressure). The impact pressure is the pressure maintained in the intake anterior to the valve 49. This pressure is determined in part by speed of flight because the scoop 20 at the end of the intake pressure faces in the direction of movement of the aircraft. Also this pressure varies with the altitude. For example, switch 82 is set to close at and above a scroll pressure of 58.5" Hg abs., which corresponds to a manifold pressure of 57" when the carburetor impact pressure is 29.9" Hg abs. The effect of the difference in area of the bellows 87 and 86 is that, when the carburetor impact pressure becomes 13.6" Hg abs., the switch 82 will be closed at and above a lower scroll pressure, for example, 53" Hg or a manifold pressure of 51.5" Hg.

Figure 11:
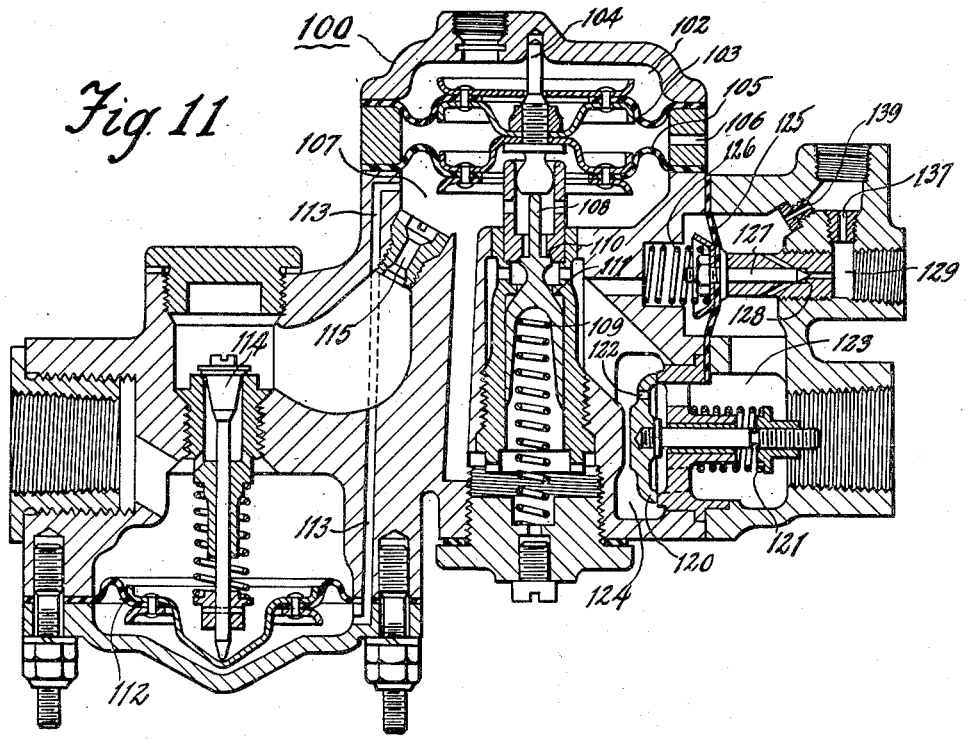
Fig. 11 is an enlarged sectional view of the water metering device shown in Fig. 5.

The outlet of pump 60 (Fig. 5) is connected by a strainer 98 and a check valve 99 with the water metering unit 100 which controls the flow of alcohol-water mixture through a pipe 101 (Figs. 4 and 3) connected with the nozzle 23. The unit 100 (Fig. 11) comprises a chamber 102 closed by a diaphragm 103 and connected by pipe 103a (Fig. 5) with that portion of the carburetor 21 which is under the pressure of unmetered fuel. A rod 104 connects diaphragm 103 with a diaphragm 105 covering a chamber 107. The space between the diaphragms is vented at 106. Therefore the pressure on diaphragm 105 from rod 104 is transferred to chamber 107 as unmetered fuel pressure unaffected by changes in altitude. A balanced valve 108 is urged upwardly by a spring 109 against seats 110 and 111. Valve 108, being engaged by pin 104, maintains metered fuel pressure in chamber 107. Metered fuel pressure on the lower side of diaphragm 112 (transferred by passage 113) and nozzle pressure on the upper side of diaphragm 112 imposes a metering head on a metering valve 114 which is the same metering force imposed on the jets of the carburetor. The contour of the valve 114 is such and the size of the metering orifice 115 is so calibrated as to give a flow of alcohol-water mixture sufficient to suppress detonation as the air flow is increased to maximum powers. The alcohol-water mixture is injected through the spray nozzle 23 along with the gasoline.

We make no claim to the water metering unit thus far described. We do claim, however, the provision of means responsive to the proper flow of water from the pump out through the nozzle 23 for causing water pressure to be transmitted to a diaphragm chamber for the purpose of controlling other instruments such as the throttle controller TC and the fluid coupling controller FC. Such means will now be described.

Before water discharged from the pump can reach the metering valve 108 it must pass around a valve 120 loaded by a spring 121 or through an orifice 122 in the valve 120. When the water is flowing properly the pressure in chamber 123 exceeds the pressure in chamber 124 by about 1 lb. per sq. inch. Then a diaphragm 125 will move left against the action of a spring 126 to move a valve 127 from its seat 128 to permit water to flow out passage 129 connected by pipes 130 and 131 with diaphragm chambers 132 (Fig. 4) and 133 (Fig. 3) respectively and by pipe 134 with a pressure operated switch 135 (Fig. 5) which then closes to cause a lamp 136 to burn to indicate the operation of the water injection apparatus. The diaphragm 142 closing chamber 132 (Fig. 4) then operates a valve 140 which causes derichment of the fuel mixture. The diaphragm 143 (Fig. 6) then operates a device (to be described later) for rendering ineffective a device which limits the intake manifold pressure so that higher pressures safe for engine operation with water injection may be obtained. When the water becomes exhausted valve 127 closes and the water pressure in the diaphragm chambers 132 and 133 quickly falls because they are connected with the tank 50 through a passage 137 and a vented return pipe 138. If the passage between the metering unit 100 and the outlet of nozzle 23 becomes clogged, the pressure differential between chamber 123 and chamber 124 decreases and spring 126 closes the valve 127; and the pressure in the diaphragm chambers 131 and 133 falls, as before. Passage 139 (Fig. 11) provides for return of liquid in chamber 123 to the tank 50.

The throttle controller TC (Figs. 3 and 4) of which the chamber 133 is a part and the fluid coupling controller FC coordinated therewith are the subject matter of the copending application of Dolza et al., Serial No. 498,968 filed August 17, 1943. Briefly, the controller TC comprises a pilot-operated main control lever 150 which operates a shaft 151 carrying a lever 152 connected by a link 153 with a cam lever 154 (Fig. 3) fixed to a shaft 155 carrying a pressure selecting cam 156 (Fig. 6) against which a spring 157 urges a lever 158 pivoted at 159 on a bridge 160 connecting the adjacent free ends of bellows 161 and 162 having their remote ends fixed to housing members 163 and 164 respectively. Bellows 161, which is evacuated to provide an aneroid, encloses springs 165 and 166; and bellows 162, which is connected with pipe 93 (Fig. 3) in a manner to be described, encloses a spring 167. These springs are so constructed and calibrated that the pivot 159 moves in a definite relation to changes in engine stage scroll pressure and to intake manifold pressure. The bellows 162 encloses a second spring 168 located within a tube 170 having a flange 171 attached to housing 164. Spring 168 surrounds a rod 172 fixed to the free end of bellows 162 and carrying an adjustable self-locking nut 173 normally spaced from the spring 168. When a certain manifold pressure is attained, the bellows 162 so expands that nut 173 begins to engage spring 168 and to compress it. Therefore, before said certain pressure is attained, a line which represents the relation between pressures and positions of pivot 159 will have a relatively gradual slope. After said certain pressure is exceeded, the line which represents the relation between pressures and positions of pivot 159 will have a steeper slope.

The controller TC includes a servo-motor comprising a cylinder 180 provided by housing 164 and a piston 181 urged right by a spring 182. The position of piston 181 is controlled by a valve 183 slidable in a guide 183a which controls the connection between a fluid pressure inlet port 184 and distributing ports 185 and 186. Ports 185 connect with groove 187 in valve guide 183a connected by passages 188 and 189 (Fig. 8) with the left end of the cylinder. Ports 186 connect with groove 190 in valve guide 183a connected by passage 191 with the right end of the cylinder. The discharge of low pressure fluid from the cylinder 180 into the bellows chamber 192 is either from the left end of cylinder 180 through passages 189, 188, groove 187, port 185 and guide 183a or from the right end of cylinder 180 through passage 191, groove 190, ports 186, guide 183a and passages 193 and 194 (Fig. 8). The hydraulic fluid under pressure is conducted from the engine oil pump (not shown) through pipe 200 (Fig. 3) connected by passages 201 and 202 and valve guide groove 203 (Fig. 6).

The servo-motor control valve 183 is under the joint control by the cam 156 (controlled by the pilot through lever 150) and by the pressure in bellows 162 connected by passages 210, 211 and 212 (Fig. 8) and by pipe 93 (Fig. 3) with the scroll or outlet of the engine stage supercharger.

The engine throttle valve 49 (Fig. 4) is under joint control by the pilot (through lever 150) and by the servo-motor through a floating lever 220 pivoted at 221 on an arm 222 attached to shaft 151. Lever 220 is connected at 223 with a link 224 connected with a lever 225 which rotates a shaft 226 carrying the valve 49. Lever 220 is connected at 230 with a link 231 connected with the rod 232 which is attached to the piston 181.

Manual control of the valve 49 is sufficient for safe landing in case of failure of oil pressure in cylinder 180 in which case the spring 182 returns the piston 181 to the right as shown in Fig. 6. The control of the valve 49 by the servo-motor corrects for any divergencies between engine intake manifold pressure or engine stage scroll pressure and the pressure selected by the cam 156 which is manually controlled.

When water injection is not used, the cam 156 controls the lever for pressure selections up to about 60" Hg abs., for example, that being the maximum pressure safe for engine operation without water injection. If a high pressure is selected, when there is no water injection, the lever 158 is stopped by a rod 240 guided by a sleeve 241 in housing 163 and urged by a spring 242 against a lever 243 pivoted at 244 and carrying a pin 245 received by a notched lever 246 attached to a shaft 247 carrying a notched lever 248 receiving a pin 249 attached to a rod 250 guided by a sleeve 251 and connected with the diaphragm 143. A spring 252 urges the rod 250 right against an adjustable stop screw 253 so long as the water injection apparatus is not functioning. When water injection is operating the pressure in chamber 133 overcomes the spring 252 and moves the diaphragm 143 left; and the rod 240 moves left to permit the lever 158 to follow the cam 156 into those positions of high pressure selection (60" to 80" Hg abs.) which are safe for engine operation when water injection is used.

The controller FC (Fig. 3), which controls the status of the fluid coupling 17 (Fig. 1) and hence the speed of the auxiliary supercharger impeller 12, is constructed somewhat like the controller TC. It has a servo-motor including a piston rod 260 (Fig. 3) connected with a tube or scoop (not shown) which determines the rotation level of hydraulic fluid in the coupling 17. This construction is fully disclosed in the copending Dolza application referred to. The control valve of this servo-motor is controlled by parts similar in construction and arrangement to certain parts of the controller TC. The similar parts are marked with the same reference numbers with the prime affixed.

Figure 10:
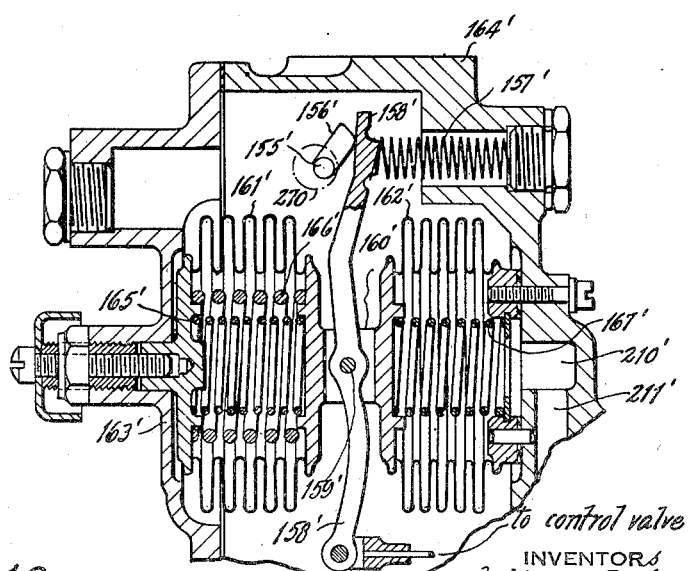
Fig. 10 is a fragmentary sectional view of the fluid coupling controller FC of Fig. 4.

Bellows 162' (Fig. 10) of controller FC is connected by passages 210' and 211' with pipe 95 (Fig. 3) with the carburetor upper deck. Hence bellows 162' responds to variation in impact pressure which varies with altitude and airplane speed. Cam shaft 155' (Fig. 10) is attached to a lever 261 (Fig. 3) connected by link 262 and pin 263 with the piston rod 260. Therefore the coupling scoop of the hydraulic coupler 17 (Fig. 1) is controlled by pressure altitude according to a predetermined schedule of changes thereof.

The specific form of fluid coupling by means of which the auxiliary supercharger can be operated at infinitely variable speed is not part of the present invention, nor is the specific construction of the means for effecting operation of such coupling. The last mentioned means which is shown herein and which is described immediately above is of the same construction as that disclosed in the application of Dolza et al., Serial No. 520,878 and in Fig. 12 there is shown a diagrammatic view of the coupling and means for controlling its action which is disclosed in the said application of Dolza et al.

This coupling which is designated in its entirety by the reference number 17, comprises, as shown, a driven vane member 300 attached to a hollow shaft 301 connected with gear 18. A driving vane member 302 is provided and is attached to an engine driven shaft 303. To the driving vane member there is attached an annular hood 304 which surrounds both vane members of the coupling. The motion transmitting fluid for the coupling passes through the hollow shaft 301 and then radially between the coupling, or vane, members. From the vane member 302, oil passes out through a number of holes 305 into the hood 304, so that the rotary level of the motion transmitting fluid in the hood is substantially the same as within the vane members.

In order to vary the slip percentage, or coupling ratio, the rotary fluid level within the coupling is varied by changing the position of a hollow coupling scoop tube 306 through which the motion transmitting fluid may flow from the coupling. The further the end of the scoop tube is from the axis of the coupling, the lower the fluid level within the coupling will be and the greater the slippage. As the end of the tube is moved toward the axis, the slippage will be decreased and the coupling ratio increased. The coupling scoop tube is automatically adjusted by movement of the piston rod 261 to which said scoop tube is operatively connected in any suitable manner.

Up to a certain pressure selection, the controller TC exercises no control over the controller FC. After that certain pressure selection is exceeded, the controller TC causes the controller FC to raise the schedule of speeds of the auxiliary supercharger in relation to a decreasing scale of altitude pressure values. This is accomplished by shifting axis of shaft 155' counterclockwise (Fig. 10) as the pressure selections are increased. To do this, the shaft 155' is mounted eccentrically in a shaft 270 (dot-dash circle in Fig. 10) carrying a lever 271 (Fig. 3) connected by a link 272 with a lever 273 pivoted at 274 on the controller, TC. Lever 273 has an opening receiving a roller 275 pivotally supported by an arm 154a of lever 154 which is engageable with a cam surface 276 provided by lever 273. This cam surface 276 is urged upwardly by a spring 277 attached to lever 271 and to the housing 164' of controller FC. When the pressure selection is high enough to cause the roller 275 to move right past the portion x of the cam surface 276, lever 271 will move up under the action of spring 277 to cause lever 261 and shaft 155' to move counterclockwise and the cam 156' to be shifted in such manner as to cause the controller FC to raise the schedule of auxiliary supercharger speeds in relation to the scale of altitude pressures. To prevent the attainment of an auxiliary supercharger speed such as to cause detonation when the altitude pressures fall to certain low values, the shaft 155' is caused to be bodily moved clockwise after a certain movement of the piston rod 260 to the left has taken place. This is effected by a stop screw 280, carried by lever 261, which engages the lever 271 which begins to rotate the shaft 270 (eccentrically supporting the shaft 155') after a certain left movement of piston rod 260 has taken place thereby causing the rod 260 to stop, thereby limiting the auxiliary supercharger speed to a value in the schedule of altitude pressure vs. supercharge speed for an intake pressure value lower than that which had been selected. In this way, the auxiliary supercharger operates according to a higher schedule of speed vs. altitude pressure when the altitude pressures are relatively high; and when the altitude pressures are relatively low, the auxiliary supercharger speeds are lowered automatically to prevent detonation.

The extent to which the altitude-pressure vs. speed schedule can be raised depends on whether water injection is used. When it is not used, the extent to which lever 273 can move upwardly under the action of spring 277, when high intake pressures are selected, is limited by the engagement of the lever 273 with a stop screw 290 carried by a lever 291 attached to shaft 247. When water injection is used, lever 291 moves up to take screw 290 entirely out of the path of movement of lever 273, so that it can follow the roller 275 into any position thereof in the higher pressure selecting positions of the lever 154.

From the foregoing description, it is apparent that the present invention comprises an instrument which causes the water injection pump to operate when there is a certain differential between engine stage scroll pressure and carburetor impact pressure or altitude pressure, means for controlling engine intake pressure and normally operative to limit the pressure to less than border-line detonation pressure when water injection is not operating, and means responsive to the flow of water-alcohol mixture from the pump to the spray nozzle for so modifying the intake pressure control means as to make it possible to obtain intake manifold pressures safe for engine operation with water injection.

The term "scroll" which is used in this specification is a term commonly used in this art and refers to the supercharger housing.

While the disclosed embodiment of the present invention includes a throttle controller coordinated with a controller of the speed of an auxiliary supercharger driven by the engine, it is to be understood that the present invention is applicable to other supercharging systems and controls therefor either with or without the variable speed auxiliary supercharger.

What is claimed is as follows:

1. A system of control for a supercharged internal combustion engine comprising, in combination, a throttle valve controller having datum adjusting means providing for selection of an engine intake pressure to be maintained and means under control by intake pressure and by said datum adjusting means for so positioning the engine throttle valve as to obtain the selected pressure, a control lever for operating the datum adjusting means, a supercharger connected with the engine intake, variable speed means for driving the supercharger and having a speed changing element, a regulator having provisions under control by altitude pressure and by the control lever for so positioning the speed changing element as to give a supercharger speed necessary to obtain the selected pressure at varying altitudes, apparatus for effecting the injection of a liquid into the engine intake, means normally operative to limit the speed obtained by operation of the speed regulator and the pressure obtained by operation of the valve controller to values required for safe operation of the engine without liquid injection, and means responsive to the proper functioning of the injection apparatus for disabling said limiting means.

2. A system of control for a supercharged internal combustion engine, comprising in combination, a throttle valve controller having datum adjusting means providing for selection of an engine intake pressure to be maintained and means under control by intake pressure and by said datum adjusting means for so positioning the engine throttle valve as to obtain the selected pressure, a control lever for operating the datum adjusting means, a supercharger connected with the engine intake, variable speed means for driving the supercharger and having a speed changing element, a regulator having provisions under control by altitude pressure and by the control lever for so positioning the speed changing element as to give a supercharger speed necessary to obtain the selected pressure at varying altitudes, a liquid supply tank, a liquid spray nozzle in the engine intake, a pump for forcing the liquid from the supply tank through the nozzle, means normally operative to limit the speed obtained by operation of the speed regulator and the pressure obtained by operation of the valve controller to values required for safe operation of the engine without liquid injection, and means responsive to the flow of liquid through the nozzle for disabling said limiting means.

3. A system of control for a supercharged internal combustion engine comprising, in combination, a throttle valve controller having datum adjusting means providing for selection of an engine intake pressure to be maintained and means under control by intake pressure and by said datum adjusting means for so positioning the engine throttle valve as to obtain the selected pressure, a control lever for operating the datum adjusting means, a supercharger connected with the engine intake, variable speed means for driving the supercharger and having a speed changing element, a regulator having provisions under control by altitude pressure and by the control lever for so positioning the speed changing element as to give a supercharger speed necessary to obtain the selected pressure at varying altitudes, a liquid supply tank, a liquid spray nozzle in the engine intake, a pump for forcing the liquid from the supply tank through the nozzle, means under control by engine intake pressure and altitude pressure for causing the pump to operate, means normally operative to limit the speed obtained by operation of the speed regulator and the pressure obtained by operation of the valve controller to values required for safe operation of the engine without liquid injection, and means responsive to the flow of liquid through the nozzle for disabling said limiting means.

4. A system of control for a supercharged internal combustion engine comprising, in combination, a throttle valve controller having datum adjusting means providing for selection of an engine intake pressure to be maintained and means under control by intake pressure and by said datum adjusting means for so positioning the engine throttle valve as to obtain the selected pressure, a control lever for operating the datum adjusting means, a liquid supply tank, a liquid spray nozzle in the engine intake, a pump for forcing the liquid from the supply tank through the nozzle, means normally operative to limit the pressure obtained by operation of the valve controller to a value required for safe operation of the engine without liquid injection, fluid pressure operated means for disabling said limiting means, a valve for controlling the fluid pressure operated means, and means responsive to the flow of liquid for actuating said valve.

5. A system of control for a supercharged internal combustion engine comprising, in combination, a throttle valve controller having datum adjusting means providing for selection of an engine intake pressure to be maintained and means under control by intake pressure and by said datum adjusting means for so positioning the engine throttle valve as to obtain the selected pressure, a control lever for operating the datum adjusting means, a liquid supply tank, a liquid spray nozzle in the engine intake, a pump for forcing the liquid from the supply tank through the nozzle, means normally operative to limit the pressure obtained by operation of the valve controller to a value required for safe operation of the engine without liquid injection, means operated by pressure of the liquid discharged from the pump for disabling said limiting means, a normally closed valve for establishing a connection between the pump outlet and the liquid pressure operated means, and means responsive to the flow of liquid through the nozzle for opening said valve.

6. A system of control for a supercharged internal cumbustion engine comprising, in combination, a throttle valve controller having datum adjusting means providing for selection of an engine intake pressure to be maintained and means under control by intake pressure and by said datum adjusting means for so positioning the engine throttle valve as to obtain the selected pressure, a control lever for operating the datum adjusting means, a liquid supply tank, a liquid spray nozzle in the engine intake, a pump for forcing the liquid from the supply tank through the nozzle, means normally operative to limit the pressure obtained by operation of the valve controller to a value required for safe operation of the engine without liquid injection, fluid pressure operated means for disabling said limiting means, a valve for controlling the fluid pressure operated means, a spring loaded valve interposed in the path of flow of liquid from the pump to the nozzle, and means responsive to the differential of pressure of the liquid anterior and posterior of said interposed valve for actuating the valve for controlling the fluid pressure operated means.

7. A system of control for a supercharged internal combustion engine comprising, in combination, a throttle valve controller having datum adjusting means providing for selection of an engine intake pressure to be maintained and means under control by intake pressure and by said datum adjusting means for so positioning the engine throttle valve as to obtain the selected pressure, a control lever for operating the datum adjusting means, a liquid supply tank, a liquid spray nozzle in the engine intake, a pump for forcing the liquid from the supply tank through the nozzle, means normally operative to limit the pressure obtained by operation of the valve controller to a value required for safe operation of the engine without liquid injection, means operated by pressure of the liquid discharged from the pump for disabling said limiting means, a normally closed valve for establishing a connection between the pump outlet and the liquid pressure operated means, and means responsive to the differential of pressure of the liquid anterior and posterior of said interposed valve for opening said normally closed valve.

8. Apparatus for controlling the intake pressure in a supercharged internal combustion engine having in combination, a throttle valve movable to different positions to variably control said intake pressure, automatic control means operable to move said throttle to maintain some selected pressure, a control lever movable to different positions to select a pressure to be maintained and to control the datum of said automatic control means, apparatus for effecting the injection of a liquid into the engine intake to prevent detonation, means normally operative to limit the intake pressure obtainable by movement of the throttle valve to a value required for safe operation of the engine without liquid injection, means for disabling said limiting means and means for preventing operation of the disabling means if the means for injecting anti-detonant does not function.

9. Apparatus for controlling the intake pressure in a supercharged internal combustion engine having in combination, a throttle valve movable to different positions to variably control said intake pressure, automatic control means operable to move said throttle to maintain some selected pressure, a control lever movable to different positions to select a pressure to be maintained and to control the datum of said automatic control means, apparatus including a liquid spray nozzle communicating with the engine intake for effecting the injection under pressure of a liquid into said intake to prevent detonation, means normally operative to limit the intake pressure obtainable by movement of the throttle valve to a value required for safe operation of the engine without liquid injection and means responsive to the flow of liquid through said nozzle into said intake for disabling said limiting means.

10. Apparatus for controlling the intake pressure in a supercharged internal combustion engine having in combination, a throttle valve movable to different positions to variably control said intake pressure, automatic control means operable to move said throttle to maintain some selected pressure, a control lever movable to different positions to select a pressure to be maintained and to control the datum of said automatic control means, a liquid supply tank, a liquid spray nozzle supplied from said tank and communicating with the engine intake, a pump for forcing liquid from the supply tank through the nozzle, means controlled by engine intake pressure and altitude pressure for causing the pump to operate, means normally operative to limit the pressure obtainable by operation of the throttle valve to a value required for safe operation of the engine without liquid injection and means responsive to flow of liquid through the nozzle for disabling the limiting means to permit a higher pressure to be obtained when there is a flow through said nozzle.

JOHN DOLZA.
MILTON A. TRISLER.
CLYDE R. PATON.

REFERENCES CITED

The following references are of record in the file of this patent:

UNITED STATES PATENTS

| Number | Name | Date |
|---|---|---|
| 2,031,527 | Dodson | Feb. 18, 1936 |
| 2,392,565 | Anderson et al. | Jan. 8, 1946 |